(12) United States Patent
Lee et al.

(10) Patent No.: US 12,100,839 B2
(45) Date of Patent: Sep. 24, 2024

(54) ELECTRODE FOR SECONDARY BATTERY HAVING IMPROVED FAST CHARGING PERFORMANCE, METHOD OF MANUFACTURING THE SAME, AND SECONDARY BATTERY INCLUDING THE SAME

(71) Applicant: SK On Co., Ltd., Seoul (KR)

(72) Inventors: Dong Hoon Lee, Daejeon (KR); Jae Youn Kim, Daejeon (KR); Jung Min Yang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 121 days.

(21) Appl. No.: 17/486,032

(22) Filed: Sep. 27, 2021

(65) Prior Publication Data

US 2022/0102727 A1    Mar. 31, 2022

(30) Foreign Application Priority Data

Sep. 28, 2020 (KR) ........................ 10-2020-0125542
Mar. 4, 2021 (KR) ........................ 10-2021-0028808

(51) Int. Cl.
*H01M 4/62* (2006.01)
*H01M 4/04* (2006.01)
*H01M 4/131* (2010.01)
*H01M 4/139* (2010.01)
*H01M 10/0525* (2010.01)
*H01M 10/48* (2006.01)

(52) U.S. Cl.
CPC ......... *H01M 4/621* (2013.01); *H01M 4/0404* (2013.01); *H01M 4/131* (2013.01); *H01M 4/139* (2013.01); *H01M 10/0525* (2013.01); *H01M 10/48* (2013.01)

(58) Field of Classification Search
CPC ........ H01M 4/621; H01M 4/622; H01M 4/64; H01M 4/70; H01M 4/0404; H01M 4/131; H01M 4/139; H01M 4/1394; H01M 4/1391; H01M 10/0525; H01M 10/052; H01M 10/48
See application file for complete search history.

(56) References Cited

U.S. PATENT DOCUMENTS

2007/0026312 A1   2/2007 Imachi et al.
2010/0273052 A1   10/2010 Sakitani et al.
(Continued)

FOREIGN PATENT DOCUMENTS

JP   H1131502 A   2/1999
JP   2009223499 A   10/2009
(Continued)

*Primary Examiner* — Raymond Alejandro
(74) *Attorney, Agent, or Firm* — The Webb Law Firm

(57) ABSTRACT

An electrode for a secondary battery, the electrode including a current collector and an electrode active material layer disposed on at least one surface of the current collector. The electrode satisfies $t_2 \leq t_1 \geq 8 \times t_2$, where $t_1$ is a thickness of the electrode active material layer excluding the current collector on the side close to the current collector based on a separated position within the electrode active material layer when a 90° bending adhesive strength of the electrode is measured, and $t_2$ is a particle size (D50) of an electrode active material included in the electrode active material layer.

10 Claims, 6 Drawing Sheets

(56) References Cited

U.S. PATENT DOCUMENTS

| | | |
|---|---|---|
| 2015/0243997 A1 | 8/2015 | Park et al. |
| 2016/0226060 A1 | 8/2016 | Uchida |
| 2017/0207441 A1* | 7/2017 | Shen .................. H01M 4/0409 |
| 2018/0006291 A1 | 1/2018 | Kim et al. |
| 2018/0069229 A1 | 3/2018 | Ko et al. |
| 2018/0076451 A1 | 3/2018 | Kim et al. |
| 2018/0198117 A1* | 7/2018 | Tiquet .................. C09D 11/04 |

FOREIGN PATENT DOCUMENTS

| | | |
|---|---|---|
| JP | 5051988 B2 | 10/2012 |
| JP | 2014107182 A | 6/2014 |
| KR | 20100112127 A | 10/2010 |
| KR | 1020120136396 A | 12/2012 |
| KR | 1020150050075 A | 5/2015 |
| KR | 1020150100129 A | 9/2015 |
| KR | 20160055876 A | 5/2016 |
| KR | 101783445 B1 | 9/2017 |
| KR | 101811833 B1 | 1/2018 |
| KR | 1020180009084 A | 1/2018 |
| KR | 20180028814 A | 3/2018 |
| KR | 1020180027258 A | 3/2018 |
| KR | 102071585 B1 | 1/2020 |
| KR | 20200084591 A | 7/2020 |

* cited by examiner

ELECTRODE FOR SECONDARY BATTERY HAVING IMPROVED FAST CHARGING PERFORMANCE, METHOD OF MANUFACTURING THE SAME, AND SECONDARY BATTERY INCLUDING THE SAME

CROSS-REFERENCE TO RELATED APPLICATION

This application claims priority to Korean Patent Application No. 10-2020-0125542 filed Sep. 28, 2020 and Korean Patent Application No. 10-2021-0028808 filed Mar. 4, 2021, the disclosures of which are hereby incorporated by reference in their entirety.

BACKGROUND OF THE INVENTION

Field of the Invention

The following disclosure relates to an electrode for a secondary battery having improved fast charging performance, a method of manufacturing the same, and a secondary battery including the same.

Description of Related Art

In recent years, a large cell for high-energy EV has a high electrode density, and thus, when the cell is charged at a high current density, a limitation occurs in diffusion of Li ions into a negative electrode, and in this case, Li ions are precipitated on the surface of a negative electrode to cause deterioration of the cell.

In order to improve the problem, it is important to keep the density of the negative electrode as low as possible, or to lower surface and internal resistance of the negative electrode so that Li ions are rapidly diffused to the inside of a negative electrode.

For improving resistance and fast charging performance of the cell, a technology of developing a binder having high adhesive strength and lowering a binder content using it is being studied, but there is a limitation in the types of binder having high adhesive strength and lowering the binder content, and when the binder content is excessively lowered, a serious problem arises in that an electrode mixture layer is desorbed in a current collector during a notching process or a cell charge and discharge process.

Therefore, a technology of efficiently distributing a binder inside the negative electrode is being developed, and in this case, it is possible to form a high binder content in the interface of the current collector to suppress desorption and lower the binder content on the surface and the mixture layer of the negative electrode, and cell performance may be improved. For this, a technology of preparing a dual layer in which a negative electrode slurry having a high binder content is formed in a lower layer and a negative electrode slurry having a low binder content is formed in an upper layer has been developed, but due to a phenomenon that binder particles move to the surface of a negative mixture layer in a general drying process, there is also a limitation in implementing an ideal binder distribution.

In addition, in order to improve adhesive strength of the negative electrode on the current collector and the surface and maintain an electrical contact for as long as possible, a technology of preparing a substrate in which conductive materials such as carbon black or CNT are coated on a current collector and forming a negative electrode mixture layer on the current collector has been developed, but the effect of improving cell performance is not sufficient.

Thus, development of a lithium secondary battery having a low interfacial specific resistance value between current collector-electrode mixture layer and improved fast charging performance is demanded.

SUMMARY OF THE INVENTION

An embodiment of the present invention is directed to providing an electrode for a lithium secondary battery which improves interfacial adhesive strength between a current collector and an electrode active material layer, prevents defects in process and appearance such as desorption of an electrode, and improves fast charging performance.

Another embodiment of the present invention is directed to providing a method of manufacturing an electrode for a lithium secondary battery which produces an electrode improving interfacial adhesive strength, preventing defects in process and appearance, and allowing fast charge.

In one general aspect, an electrode for a secondary battery includes: a current collector; and an electrode active material layer disposed on at least one surface of the current collector, wherein the electrode satisfies the following Relation 1:

$$t_2 \leq t_1 \leq 8 \times t_2 \qquad \text{[Relation 1]}$$

wherein $t_1$ is a thickness of the electrode active material layer excluding the current collector on the side close to the current collector based on a separated position within the electrode active material layer when a 90° bending adhesive strength of the electrode is measured, and $t_2$ is a particle size (D50) of an electrode active material included in the electrode active material layer.

The electrode may further satisfy the following Relation 2:

$$1.5 \times t_2 \leq t_1 \leq 5 \times t_2 \qquad \text{[Relation 2]}$$

wherein $t_1$ is a thickness of the electrode active material layer excluding the current collector on the side close to the current collector based on a separated position within the electrode active material layer when a 90° bending adhesive strength of the electrode is measured, and $t_2$ is a particle size (D50) of an electrode active material included in the electrode active material layer.

The electrode active material layer may further include a styrene butadiene rubber (SBR)-based binder.

The electrode active material layer may include 0.1 to 2 wt % of the binder with respect to the total weight.

The electrode may further satisfy the following Relation 3:

$$0.25 \leq b_2/b_1 < 0.7 \qquad \text{[Relation 3]}$$

wherein $b_1$ is a weight of the binder in the entire electrode active material layer, and $b_2$ is a weight of the binder in a 15% area from the current collector based on the total thickness of the electrode active material layer, when a binder distribution is measured in the thickness direction of the electrode active material layer.

The electrode may further satisfy the following Relation 4:

$$0.3 \leq b_2/b_1 < 0.5 \qquad \text{[Relation 4]}$$

wherein $b_1$ is a weight of the binder in the entire electrode active material layer, and $b_2$ is a weight of the binder in a 15% area from the current collector based on the total thickness of the electrode active material layer, when a binder distribution is measured in the thickness direction of the electrode active material layer.

The electrode may have a continuous binder concentration in the thickness direction of the electrode.

The electrode may further satisfy the following Relation 5:

$$-30\% \leq (C-D)/D \leq +30\%$$ [Relation 5]

wherein C is an interfacial adhesive strength between the current collector and the electrode active material layer, measured at an arbitrary position selected in the width direction of the electrode active material layer, and D is an average value of the interfacial adhesive strength between the current collector and the electrode active material layer.

The electrode may be a negative electrode.

In another general aspect, a method of manufacturing an electrode for a secondary battery includes: a) applying a binder suspension on at least one surface of a current collector; b) applying an electrode slurry containing an electrode active material on the binder suspension; and c) drying a resultant product from step b), wherein steps a) and b) are performed simultaneously or sequentially.

Step a) may be a step of evenly applying the binder suspension on one surface of the current collector.

In step a), an application thickness of the binder suspension may be 0.1 to 10 μm.

The binder suspension includes 30 wt % or more of the binder with respect to the total solid content, and the electrode slurry may include 2 wt % or less of the binder with respect to the total solid content.

Step c) may be performed at a temperature of 50 to 200° C. for 30 to 300 seconds.

In another general aspect, an electrode for a secondary battery manufactured by the following method is provided, the method including: a) applying a binder suspension on at least one surface of a current collector; b) applying an electrode slurry containing an electrode active material on the binder suspension; and c) drying a product resulted from step b), wherein steps a) and b) are performed simultaneously or sequentially.

In still another general aspect, a lithium secondary battery includes: the electrode; a separator; and an electrolyte solution.

Other features and aspects will be apparent from the following detailed description, the drawings, and the claims.

DETAILED DESCRIPTION OF MAIN ELEMENTS

Figure 1:
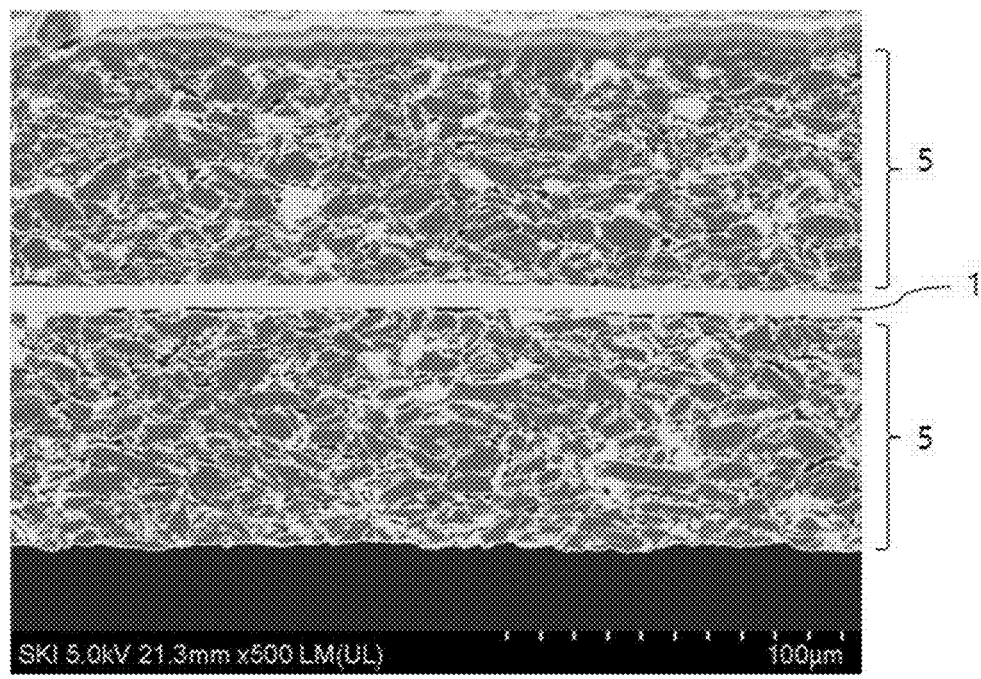
FIGS. 1 and 2 are cross-sectional SEM images in a thickness direction of negative electrodes manufactured in Example 1 and Comparative Example 6.

1: current collector
3: binder layer
5: electrode active material layer
11: binder

DESCRIPTION OF THE INVENTION

Advantages and features of the present invention and methods to achieve them will be elucidated from exemplary embodiments described below in detail with reference to the accompanying drawings. However, the present invention is not limited to exemplary embodiments disclosed below, but will be implemented in various forms. The exemplary embodiments of the present invention make disclosure of the present invention thorough and are provided so that those skilled in the art can easily understand the scope of the present invention. Therefore, the present invention will be defined by the scope of the appended claims. Detailed description for carrying out the present invention will be provided with reference to the accompanying drawings below. Regardless of the drawings, the same reference number indicates the same constitutional element, and "and/or" includes each of and all combinations of one or more of mentioned items.

Unless otherwise defined herein, all terms used in the specification (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

In the present specification, it will be understood that when an element such as a layer, film, region, or substrate is referred to as being "on" or "above" another element, it can be directly on the other element or intervening elements may also be present.

An exemplary embodiment of the present invention provides an electrode for a lithium secondary battery. The electrode for a lithium secondary battery includes: a current collector; and an electrode active material layer disposed on at least one surface of the current collector, wherein the electrode satisfies the following Relation 1:

$$t_2 \leq t_1 \leq 8 \times t_2$$ [Relation 1]

wherein $t_1$ is a thickness of the electrode active material layer excluding the current collector on the side close to the current collector based on a separated position within the electrode active material layer when a 90° bending adhesive strength of the electrode is measured, and $t_2$ is a particle size (D50) of an electrode active material included in the electrode active material layer.

The electrode active material layer may be formed by applying a binder suspension on at least one surface of the current collector and applying an electrode slurry on the applied binder suspension, or applying the binder suspension and the electrode slurry simultaneously on at least one surface and drying the resultant product.

The binder suspension may be prepared by including a binder and a solvent. The suspension refers to a mixture in which undissolved binders are present in the form of particles in the solvent, and a thickener, a conductive material, and the like may be further mixed and used as necessary.

The binder may include a styrene butadiene rubber (SBR)-based binder, and for example, a styrene-butadiene rubber, a styrene-butadiene acrylate copolymer, and the like may be included, but the present invention is not limited thereto. Thus, the electrode active material layer may further include a styrene butadiene rubber (SBR)-based binder.

The electrode active material layer may include 0.1 to 2 wt %, 0.1 to 1.8 wt %, 0.5 to 1.8 wt %, or 0.5 to 1.5 wt % of the binder, with respect to the total weight. In the present invention, a plurality of binders is distributed in the interface between the current collector and the active material layer and a binder content is decreased in an electrode surface side, thereby significantly decreasing the total amount of the binder included in the entire active material layer. Accordingly, the interfacial adhesive strength between the current and the active material layer may be improved and also fast charging performance may be improved.

When the SBR-based binder and the like are used, the binder is mixed in a particle phase, so that a viscosity of the binder suspension is very low. In addition, since the size of binder particles is 200 nm or less which is small, it is easy for binder particles to migrate to an upper electrode active material layer by osmotic pressure when an upper electrode slurry is applied and dried, and even after drying, a clear binder layer may not be formed between the current collector and the active material layer. In addition, since spreadability with the current collector is good, the binder may be evenly applied at a relatively small thickness, without forming a separate pattern in the width direction of the current collector, and thus, the adhesive strength between the current collector and the electrode active material layer may be uniformly improved. However, polyacrylic acid (PAA), polyvinylidene fluoride (PVdF), carboxyethyl cellulose (CMC) and the like, which may be used as the electrode binder in addition to the SBR-based binder, are, unlike the SBR-based binder and the like, applied in a state of being dissolved in a solvent, and when the electrode is dried, phase separation is performed after the solvent is sufficiently dried to form the binder layer. Thus, it is not easy for the binder to migrate to the upper electrode active material layer during the drying process, and furthermore, a clear binder layer may be formed between the current collector and the active material layer. In addition, the binder is not evenly distributed in the width direction of the current collector and forms a pattern (for example, island type and dot type), and as a result, adhesive strength and an interfacial specific resistance value between the current collector and the active material layer are not good.

The solvent may be at least one selected from the group consisting of water, pure water, deionized water, distilled water, ethanol, isopropanol, methanol, acetone, n-propanol, and t-butanol, but is not limited thereto.

The binder suspension may further include a thickener for imparting viscosity to form a stable solution. As an example, one or more of cellulose-based compounds, specifically, carboxymethyl cellulose, hydroxypropylmethyl cellulose, methyl cellulose, an alkali metal salt thereof, and the like may be mixed and used as the thickener. As the alkali metal, Na, K, or Li may be used.

The conductive material is used for imparting conductivity to the electrode, and is not particularly limited as long as it is a conventional electrical-conductive material which does not cause a chemical change. As an example, a conductive material selected from the group consisting of natural graphite, artificial graphite, carbon black, acetylene black, ketjen black, carbon fiber, carbon nanotubes, and a combination thereof may be used, but is not limited thereto.

The current collector may be selected from the group consisting of a copper foil, a nickel foil, a stainless steel foil, a titanium foil, a nickel foam, a copper foam, a polymer substrate coated with a conductive metal, and a combination thereof, but is not limited thereto.

The binder suspension may have a viscosity of 1 to 10,000 cps, 5 to 5,000 cps, or 10 to 2,000 cps. When the binder suspension having the viscosity is used, the binder suspension may be evenly applied on the current collector, and the binder particles may migrate well to the upper portion in a drying process.

The electrode active material layer is formed by applying the binder suspension and applying an electrode slurry on the applied binder suspension. Otherwise, the electrode active material layer may be formed by applying the binder suspension as the lower layer and the electrode slurry as the upper layer simultaneously.

When the electrode is a positive electrode, the electrode active material may be used without limitation as long as it is a positive electrode active material commonly used in a secondary battery. As an example, any one positive electrode active material particles selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM^1_yM^2_zO_2$ (wherein $M^1$ and $M^2$ are independently of each other any one selected from the group consisting of Al, Ni, Co, Fe, Mn, V, Cr, Ti, W, Ta, Mg, and Mo; and x, y, and z are independently of one another atomic fractions of oxide composition elements, and satisfy $0 \leq x < 0.5$, $0 \leq y < 0.5$, $0 \leq z < 0.5$, and $x+y+z \leq 1$), or a mixture of two or more may be included.

When the electrode is a negative electrode, the electrode active material may be used without imitation as long as it is a negative electrode active material commonly used in a secondary battery. As an example, it may be a carbon-based negative electrode active material, a silicon-based negative electrode active material, or a mixture thereof, but is not limited thereto. The carbon-based negative electrode active material may be one or more selected from artificial graphite, natural graphite, and hard carbon. The silicon-based negative electrode active material may be Si, $SiO_x(0<x<2)$, a Si-Q alloy (wherein Q is an element selected from the group consisting of alkali metals, alkali earth metals, Group 13 elements, Group 14 elements, Group 15 elements, Group 16 elements, transition metals, rare earth elements, and a combination thereof, but is not Si), a Si-carbon composite, or a mixture of at least one thereof with $SiO_2$.

The electrode slurry may further include a conductive material, a binder, a thickener, or a combination thereof as necessary. As the conductive material and the thickener, any material used in the binder suspension described above may be used, and they may be identical to or different from each other, but the present invention is not limited thereto.

The electrode slurry may include 90 wt % or more, preferably 90 to 99.5 wt %, 95 to 99.5 wt %, or 98 to 99.5 wt % of the electrode active material, may include 2.0 wt % or less, 1.5 wt % or less, or 1.0 wt % or less of the binder or no binder, or may include the conductive material and the thickener as residues. Though the binder content in the electrode slurry is low, interfacial adhesive strength between the current collector and the electrode active material layer may be increased by migration of the binder particles when drying the binder suspension, and the resistance on the electrode surface is decreased to improve fast charging performance.

The electrode for a lithium secondary battery according to an exemplary embodiment of the present invention may satisfy the following Relation 1 when a 90° bending adhesive strength of the electrode is measured.

Meanwhile, the results of evaluating the 90° bending adhesive strength of the electrode mean that 90 or more or 95 or more among 100 electrode samples prepared satisfy the following Relation 1:

$$t_2 \leq t_1 \leq 8 \times t_2 \qquad \text{[Relation 1]}$$

wherein $t_1$ is a thickness of the electrode active material layer excluding the current collector on the side close to the current collector based on a separated position within the electrode active material layer when a 90° bending adhesive strength of the electrode is measured, and $t_2$ is a particle size (D50) of an electrode active material included in the electrode active material layer.

In Relation 1, the electrode active material may be one electrode active material having the same particle diameter, and $t_2$ may be a particle size (D50) of the electrode active material layer.

In Relation 1, the electrode active material layer may be a mixture of two or more electrode active materials having different particle diameters, and $t_2$ may be a particle size (D50) of one electrode active material included at the highest weight among the mixed electrode active materials.

In Relation 1, the electrode active material may be a mixture of two or more electrode active materials having different particle diameters, and $t_2$ may be a particle size (D50) of an electrode active material having a large diameter among the mixed electrode active materials. Here, the electrode active material having a large diameter may refer to an electrode active material having the largest particle diameter among two or more electrode active materials having different particle diameters.

More specifically, in Relation 1, $t_2 \leq t_1 \leq 7 \times t_2$, $t_2 \leq t_1 \leq 6 \times t_2$, $t_2 \leq t_1 \leq 5 \times t_2$, $t_2 \leq t_1 \leq 4 \times t_2$, $t_2 \leq t_1 \leq 3 \times t_2$ or $t_2 \leq t_1 \leq 2 \times t_2$ may be satisfied, and $1.5 \times t_2 \leq t_1 \leq 7 \times t_2$, $1.5 \times t_2 \leq t_1 \leq 6 \times t_2$, or $1.5 \times t_2 \leq t_1 \leq 5.5 \times t_2$ may be satisfied.

Thus, the electrode of the present invention satisfying Relation 1 may undergo separation inside the electrode active material layer when the 90° bending adhesive strength of the electrode is measured, and specifically, for example, may undergo separation at a position corresponding to the thickness of a medium particle size (D50), or 5 times the thickness of a medium particle size (D50), when viewed from the thickness direction of the electrode, That is, when the 90° bending adhesive strength of the electrode is measured, the separated position within the electrode active material layer may be a position at which the thickness of the electrode active material layer on the side close to the current collector is $t_2$ to $5 \times t_2$.

Specifically, it may be understood that the electrode active material layer forms (one) layer in which active material particles are evenly arranged in the width direction (wherein the layer thickness is D50 of the electrode active material), and a plurality of the layers are laminated in the thickness direction. That is, in the present invention, it is analyzed that when the 90° active material particle is measured, the results are derived from separation at the position of the thickness of one active material particle (D50) to the thickness of five particle units (5×D50) in the thickness direction.

Thus, the electrode of the present invention may improve defects in the process/appearance such as interfacial desorption of a negative electrode and improve fast charging performance, even though the binder content is greatly lowered as compared with the conventional art in a negative electrode slurry forming the negative electrode active material.

The electrode may further satisfy the following Relation 2, thereby further improving the effects described above:

$$1.5 \times t_2 \leq t_1 \leq 5 \times t_2 \qquad \text{[Relation 2]}$$

wherein $t_1$ is a thickness of the electrode active material layer excluding the current collector on the side close to the current collector based on a separated position within the electrode active material layer when a 90° bending adhesive strength of the electrode is measured, and $t_2$ is a particle size (D50) of an electrode active material included in the electrode active material layer.

More specifically, in Relation 2, $1.5 \times t_2 \leq t_1 \leq 4 \times t_2$, $1.5 \times t_2 \leq t_1 \leq 3 \times t_2$, or $1.5 \times t_2 \leq t_1 \leq 2 \times t_2$ may be satisfied.

Meanwhile, the electrode active material layer may be formed by applying a binder suspension on at least one surface of the current collector and applying an electrode slurry on the applied binder suspension, or performing both a step of applying the binder suspension on at least one surface of the current collector and a step of applying the electrode slurry on the binder suspension and then drying the resultant product.

Meanwhile, in the present invention, the particle size (D50) of the electrode active material may be 1 to 20 μm, 3 to 15 μm, 7 to 15 μm, or 9 to 15 μm, but is not limited thereto. The particle size (D50) may refer to a particle diameter with a cumulative volume of 50% when cumulated from the smallest particle in measurement of a particle size distribution by a laser scattering method. Here, for D50, the particle size distribution may be measured by collecting a sample according to a KS A ISO 13320-1 standard and using Mastersizer 3000 from Malvern Panalytical Ltd. Specifically, a volume density may be measured after particles are dispersed in ethanol as a solvent, using an ultrasonic disperser, if necessary.

The electrode may further satisfy the following Relation 3:

$$0.25 \leq b_2/b_1 < 0.7 \qquad \text{[Relation 3]}$$

wherein $b_1$ is a weight of the binder in the entire electrode active material layer, and $b_2$ is a weight of the binder in a 15% area from the current collector based on the total thickness of the electrode active material layer, when a binder distribution is measured in the thickness direction of the electrode active material layer.

In Relation 3, for a $b_2/b_1$ binder weight ratio, when a styrene butadiene rubber (SBR)-based binder is used as the binder, Os gas may be adsorbed on the binder to apply a content (at %) for an Os element, but this is not limited to the Os element, and an element which may represent the corresponding binder may be used depending on the type of binder.

Specifically, $0.25 \leq b_2/b_1 < 0.6$ or $0.3 \leq b_2/b_1 < 0.6$ may be satisfied.

The electrode may further satisfy the following Relation 4, and in the case, the effect described above may be further improved.

$$0.3 \leq b_2/b_1 < 0.5 \qquad \text{[Relation 4]}$$

wherein $b_1$ is a weight of the binder in the entire electrode active material layer, and $b_2$ is a weight of the binder in a 15% area from the current collector based on the total thickness of the electrode active material layer, when a binder distribution is measured in the thickness direction of the electrode active material layer.

A 15% area from the current collector based on the total thickness of the electrode active material layer may include 0.2 to 7 wt %, 1 to 5 wt %, or 1 to 4.5 wt % of the binder with respect to the total weight of the solid content of the area.

In addition, the electrode active material layer is characterized in that the binder has a continuous concentration in the thickness direction of the electrode.

In the present specification, the binder being "continuously" distributed means that the binder suspension and the electrode slurry are not formed as a separate divided layer but the binder is continuous in the electrode active material layer, and thus, the concentration (wt %) value of the binder is continuous in the thickness direction of the electrode active material layer. Meanwhile, the "concentration of the binder" may refer to the binder content (wt %) with respect to the total weight of the electrode active material layer in a unit volume (cross-sectional area in the width direction×unit thickness).

More specifically, since the binder particles migrate from the interface with the current collector to a certain area of the active material layer in the electrode active material layer, the binder may be concentrated and distributed in the corresponding area and be continuously present. However, in the electrode active material layer area where migration of the binder particles does not occur from the interface, a small amount of the binder included in the electrode slurry may exist, and thus, it is possible that the binder is distributed at a relatively high concentration in the area where the migration of the binder occurs. That is, the binder may be present at a continuous concentration in a certain area of the electrode active material layer by the migration of the binder particles in the binder suspension applied on the current collector.

Specifically, for example, when the interface between the current collector and the electrode active material layer is 0% of the thickness, as an example of being disposed in the current collector side, the binder may have a continuous concentration in the thickness direction of the electrode in an area of 0 to 35%, an area of 0 to 55%, an area of 0 to 75%, an area of 0 to 95%, or an area of 0 to 100% (the entire electrode active material layer) of the total thickness of the electrode active material layer.

Accordingly, since interfacial adhesion (interfacial coalescence) between the current collector and the electrode active material layer is stronger than internal cohesion (internal aggregation) within the negative electrode active material layer, the interfacial adhesive strength may be increased, and due to the improved intercalation/deintercalation of lithium ions within the electrode active material layer, the fast charging performance of a battery may be improved.

The electrode may further satisfy the following Relation 5:

$$-30\% \leq (C-D)/D \leq +30\%$$ [Relation 5]

wherein C is an interfacial adhesive strength between the current collector and the electrode active material layer, measured at an arbitrary position selected in the width direction of the electrode active material layer, and D is an average value of the interfacial adhesive strength between the current collector and the electrode active material layer.

Specifically, $-25\% \leq (C-D)/D \leq +25\%$, $-20\% \leq (C-D)/D \leq +20\%$, $-15\% \leq (C-D)/D \leq +15\%$, or $-10\% \leq (C-D)/D \leq +10\%$ may be satisfied. In Relation 5, C may be measured at a position having constant intervals, for example, 0.1 to 0.5 mm, 0.2 to 0.3 mm, or as an example, 0.25 mm intervals in the width direction of the electrode active material layer, respectively, but the present invention is not limited thereto.

According to an exemplary embodiment, the electrode may be a negative electrode.

Thus, in the present invention, the binder suspension, specifically a suspension including a specific binder such as SBR is used, thereby evenly applying a high-content binder suspension at a relatively small thickness in the width direction of the current collector without forming a separate pattern, and also since the binder particles migrate to a certain area of the electrode active material layer, adhesive strength between the current collector and the electrode active material layer may be further improved.

In addition, the electrode may have an interfacial specific resistance value between the current collector and the electrode active material layer of 0.1 $\Omega cm^2$ or less, 0.05 $\Omega cm^2$ or less, or 0.03 $\Omega cm^2$ or less. By the effect of the present invention described above, the interfacial specific resistance value may be significantly reduced.

Another exemplary embodiment of the present invention provides a method of manufacturing the electrode for a lithium secondary battery. The method of manufacturing an electrode includes: a) applying a binder suspension on at least one surface of a current collector; b) applying an electrode slurry containing an electrode active material on the binder suspension; and c) drying a resultant product from step b), wherein steps a) and b) are performed simultaneously or sequentially.

In step a), the current collector is prepared and the binder suspension is applied on at least one surface of the current collector.

The type of binder and solvent and the current collector are as described above. The method of preparing the binder suspension may be any method known in the art, and for example, the binder suspension may be prepared by mixing a specific binder such as the SBR-based binder with a solvent and diluting the solution to have an appropriate viscosity, but the present invention is not limited thereto.

Step a) may be a step of evenly applying the binder suspension on at least one surface of the current collector. In the present specification, evenly applying the binder suspension means evenly applying the binder suspension on the current collector so that the binder does not form a specific pattern.

According to an exemplary embodiment, in step a), the binder suspension may be applied at a thickness of 0.1 to 10 μm. More specifically, the application thickness of the binder suspension may be 0.1 to 6 μm, 0.1 to 5 μm, 0.1 to 4 μm, 0.1 to 3 μm, 0.1 to 2 μm, or 0.1 to 1 μm. Here, the application thickness of the binder suspension represents a value obtained by measuring a thickness in a sufficiently dried state after applying only the binder suspension. When the thickness of the binder suspension applied is excessive, the binder suspension is not mixed with the electrode slurry well, so that interlayer division thereof is clear after drying and a binder layer which is an insulator is formed, thereby increasing interfacial resistance. However, when the application thickness of the binder suspension is less than 0.1 μm, it may be difficult to achieve the purpose intended in the present invention. That is, within the thickness range described above, an increase in interfacial resistance may be prevented, interfacial adhesive strength between the current collector and the electrode active material layer may be improved, and process defects such as electrode desorption may be improved.

According to an exemplary embodiment, the binder suspension may include 30 wt % or more of the binder with respect to the total solid content, and the electrode slurry may include 2 wt % or less of the binder with respect to the total solid content. More specifically, the binder suspension may include 30 wt % or more, 50 wt % or more, or 70 wt % or more of the binder with respect to the total solid content, and the electrode slurry may include 2 wt % or less, 1.5 wt % or less, or 1 wt % or less of the binder with respect to the total solid content.

After step a), in step b), the electrode slurry containing an electrode active material is applied on the binder suspension.

The electrode active material is as described above, and the method of preparing the electrode slurry may be any method known to be used to form an electrode slurry for a secondary battery.

Applying the binder suspension in step a) and applying the electrode slurry in step b) may be performed using, as a non-limiting example, any application method known to be used to form a film by applying a liquid. For example, methods such as spray coating, dip coating, spin coating, gravure coating, slot die coating, doctor blade coating, roll coating, inkjet printing, flexographic printing, screen printing, electrostatic hydrodynamic printing, micro contact printing, imprinting, reverse offset printing, bar-coating, gravure offset printing, and multilayer simultaneous die coating may be used, but the present invention is not limited thereto.

Specifically, the binder suspension and the electrode slurry may be sequentially applied, and the binder suspension and the electrode slurry may be simultaneously applied by the multilayer simultaneous die coating method. However, it may be preferred in terms of uniformity or quality of electrode surface to apply the electrode slurry after applying the binder suspension.

After step b), in step c), the resultant product from step b) is dried.

Here, the drying may be performed for a period of 30 to 300 seconds, for example, 30 seconds or more, 40 seconds or more, 50 seconds or more, 60 seconds or more, 70 seconds or more, 80 seconds or more, or 90 seconds or more and 300 seconds or less, 280 seconds or less, 260 seconds or less, 240 seconds or less, 220 seconds or less, 200 seconds or less, 180 seconds or less, 160 seconds or less, 150 seconds or less, 140 seconds or less, 130 seconds or less, 120 seconds or less, or 110 seconds or less. In addition, the drying may be performed at a temperature of 50 to 200° C., for example, 50° C. or higher, 60° C. or higher, 70° C. or higher, 80° C. or higher, or 90° C. or higher and 200° C. or lower, 190° C. or lower, 180° C. or lower, 170° C. or lower, 160° C. or lower, 150° C. or lower, 140° C. or lower, 130° C. or lower, 120° C. or lower, or 110° C. or lower. When the drying temperature is excessively high or the drying time is short, migration of the binder particles is excessive, so that the interfacial adhesive strength may not be sufficiently implemented. As an example, step c) may be performed at a temperature of 80 to 130° C. for 30 to 300 seconds.

Then, the electrode being dried was rolled to an appropriate density to manufacture an electrode in which the electrode active material layer is formed on the current collector. Here, rolling conditions such as the rolling and a known rolling density and a rolling method may be applied, but the present invention is not limited thereto.

In the method of manufacturing an electrode for a secondary battery of the present invention, when drying in step c), the binder particles of the binder suspension migrates to the electrode active material layer and are present in a concentrated state in a certain area of the electrode active material layer, and thus, the problem of decreased interfacial specific resistance value and decreased adhesive strength between the current collector and the active material layer may be improved, which conventionally occurs when applying the binder solution.

Another exemplary embodiment of the present invention provides an electrode for a secondary battery manufactured by a method of manufacturing an electrode for a secondary battery, the method including: a) applying a binder suspension on at least one surface of a current collector; b) applying an electrode slurry containing an electrode active material on the binder suspension; and c) drying a product resulted from step b), wherein steps a) and b) are performed simultaneously or sequentially.

Here, the electrode is as described above.

In addition, the present invention provides a secondary battery including the electrode; a separator; and an electrolyte solution.

The electrode is as described above.

The separator is not particularly limited as long as it is a separator known in the art. For example, the separator may be selected from glass fiber, polyester, polyethylene, polypropylene, polytetrafluoroethylene, or a combination thereof, may be in the form of nonwoven or woven fabric, and may be used optionally in the form of a single layer or multilayer structure.

The electrolyte solution includes a non-aqueous organic solvent and an electrolytic salt. The non-aqueous organic solvent may be ethylene carbonate (EC), propylene carbonate (PC), dimethyl carbonate (DMC), diethyl carbonate (DEC), ethylmethyl carbonate (EMC), 1,2-dimethoxyethene (DME), γ-butyrolactone (BL), tetrahydrofuran (THF), 1,3-dioxolane (DOL), diethylether (DEE), methyl formate (MF), methyl propionate (MP), sulfolane (S), dimethyl sulfoxide (DMSO), acetonitrile (AN), or a mixture thereof, but is not limited thereto. The electrolytic salt is a material which is dissolved in the non-aqueous organic solvent and serves as a source of electrolytic metal ions in the battery to allow basic operation of the secondary battery and is a material which promotes movement of electrolytic metal ions between a positive electrode and a negative electrode. As a non-limiting example, when the electrolytic metal is lithium, the electrolytic salt may be $LiPF_6$, $LiBF_4$, LiTFSI, $LiSbF_6$, $LiAsF_6$, $LiClO_4$, $LiCF_3SO_3$, Li $(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are a natural number), LiCl, LiI, or a mixture thereof, but the present invention is not limited thereto. In addition, as the electrolytic salt, a known material may be used at a concentration for purpose, and if necessary, a known solvent or an additive may be further included for improving charge/discharge properties, flame retardancy, and the like.

In the method of manufacturing a lithium secondary battery according to the present invention for achieving the above object, the negative electrode prepared, separator, and positive electrode are laminated in this order to form an electrode assembly, the electrode assembly manufactured is placed in a cylindrical battery case or an angled battery case, and then an electrolyte solution is injected to manufacture a battery. Otherwise, the lithium secondary battery may be manufactured by laminating the electrode assembly and immersing the assembly in the electrolyte to obtain a resultant product which is then placed in a battery case and sealed.

As the battery case used in the present invention, those commonly used in the art may be adopted, there is no limitation in appearance depending on the battery use, and for example, a cylindrical shape, an angled shape, a pouch shape, a coin shape, or the like using a can may be used.

The lithium secondary battery according to the present invention may be used in a battery cell used as a power supply of a small device, and also may be preferably used as a unit cell in a medium or large battery module including a plurality of battery cells. Preferred examples of the medium or large device include an electric automobile, a hybrid electric automobile, a plug-in hybrid electric automobile, a system for power storage, and the like, but are not limited thereto.

Hereinafter, the present invention will be described in detail by the Examples, however, the Examples are for describing the present invention in more detail, and the scope of the present invention is not limited to the following Examples.

EXAMPLE

Example 1

<Manufacture of Negative Electrode>

An SBR (BM451B available from Zeon) suspension as a binder was diluted in pure water to prepare a binder suspension.

A negative electrode active material in which artificial graphite (D50: 13 μm) and natural graphite (D50: 10 μm) were mixed at a weight ratio of 5:5, a CMC thickener, and an SBR binder were added to water at a weight ratio of 98.5:1:0.5 to prepare a negative electrode slurry having a viscosity of 5,000 cps.

The thus-prepared binder suspension and negative electrode slurry were applied at thicknesses of 1 μm (based on the thickness after drying when the binder suspension is applied alone) and 200 μm, respectively, on one surface of a copper current collector (copper foil having a thickness of 8 μm) using a slot die by a multilayer simultaneous die coating method and dried, and application was performed in the same manner on the other surface and dried. Here, the drying conditions were as described in the following Table 5.

The negative electrode after drying was rolled (rolling density: 1.68 g/cm$^3$) to manufacture a negative electrode in which a negative electrode active material layer was formed on the current collector.

The negative electrode manufactured at this time had a solid composition of the negative electrode active material of 97.5 wt % of the negative electrode active material, 1.5 wt % of the SBR binder, and 1 wt % of the CMC thickener. In addition, the negative electrode manufactured was formed to have a copper foil thickness of 8 μm and a negative electrode active material layer thickness of 127 μm, and it was confirmed that the negative electrode was formed as one negative electrode active material layer without a clearly divided boundary between the binder layer and the negative electrode active material layer on an SEM image.

<Manufacture of Positive Electrode>

Li [Ni$_{0.88}$Co$_{0.1}$Mn$_{0.02}$]O$_2$ as a positive electrode active material, carbon black as a conductive material, and polyvinylidene fluoride (PVdF) as a binder were mixed at a weight ratio of 96.5:2:1.5 to prepare a slurry. The slurry was evenly applied on an aluminum foil having a thickness of 12 μm and was dried under vacuum to manufacture a positive electrode for a secondary battery.

<Manufacture of Secondary Battery>

The positive electrode and the negative electrode were laminated by notching at predetermined sizes, respectively, a separator (polyethylene, thickness of 13 μm) was interposed between the positive electrode and the negative electrode to form an electrode cell, and then tap parts of the positive electrode and the negative electrode were welded, respectively. An assembly of welded positive electrode/separator/negative electrode was placed in a pouch, and three sides except an electrolyte solution injection side were sealed. Here, a portion where the electrode tab exists was included in a sealing part.

The electrolyte solution was injected through other sides except the sealing part, the remaining side was sealed, and impregnation was performed for 12 hours or more.

As the electrolyte solution, a solution obtained by dissolving 1M LiPF$_6$ in a mixed solvent of EC/EMC/DEC (25/45/30; volume ratio) and adding 1 wt % of vinylene carbonate (VC), 0.5 wt % of 1,3-propene sultone (PRS), and 0.5 wt % of lithium bis(oxalato)borate (LiBOB) was used.

Thereafter, pre-charging was performed at a current corresponding to 0.25 C for 36 minutes. After 1 hour, degassing was performed, aging was performed for 24 more, and then formation charge and discharge were performed (charge condition: CC-CV 0.2 C 4.2 V 0.05 C CUT-OFF, discharge condition: CC 0.2 C 2.5 V CUT-OFF).

Thereafter, standard charge and discharge were performed (charge condition: CC-CV 0.33 C 4.2 V 0.05 C CUT-OFF, discharge condition: CC 0.33 C 2.5 V CUT-OFF).

Example 2

A negative electrode, a positive electrode, and a secondary battery were manufactured in the same manner as in Example 1, except that in the coating of the binder suspension and the negative electrode slurry, the binder suspension was first applied by gravure coating and then the negative electrode slurry was applied using a slot die.

Example 3

A negative electrode, a positive electrode, and a secondary battery were manufactured in the same manner as in Example 1, except that SBR (BM451B available from Zeon) and CMC (D2200 available from Daicel) as a binder were mixed at a solid content ratio of 97:3 and diluted to prepare a binder suspension.

Example 4

A negative electrode, a positive electrode, and a secondary battery were manufactured in the same manner as in Example 1, except that the thus-prepared binder suspension and negative electrode slurry were applied at thicknesses of 7 μm (based on the thickness after drying when the binder suspension is applied alone) and 132 μm, respectively, on one surface of a copper current collector (copper foil having a thickness of 8 μm) using a slot die by a multilayer simultaneous die coating method.

Comparative Example 1

A negative electrode active material in which artificial graphite (D50: 13 μm) and natural graphite (D50: 10 μm)

were mixed at a weight ratio of 5:5, an SBR binder, and a CMC thickener were added to water at a weight ratio of 97.5:1.5:1 to prepare a negative electrode slurry having a viscosity of 5,000 cps.

The thus-prepared negative electrode slurry was applied on one surface of the copper current collector (copper foil having a thickness of 8 μm) using a slot die by a die coating method, was applied in the same manner on the other surface, and was dried. The negative electrode after drying was rolled (rolling density: 1.68 g/cm$^3$) to manufacture a negative electrode in which a negative electrode active material layer was formed on the current collector.

Here, the negative electrode was formed so that a copper foil thickness was 8 μm and a negative electrode active material layer thickness was 126 μm.

A positive electrode and a secondary battery were manufactured in the same manner as in Example 1, except that the manufactured negative electrode was used.

Comparative Example 2

A negative electrode active material in which artificial graphite and natural graphite were mixed at a weight ratio of 5:5, an SBR binder, and a CMC thickener were added to water at a weight ratio of 97:2:1 to prepare a first negative electrode slurry.

A negative electrode active material in which artificial graphite and natural graphite were mixed at a weight ratio of 5:5, an SBR binder, and a CMC thickener were added to water at a weight ratio of 98:1:1 to prepare a second negative electrode slurry.

The first negative electrode slurry and the second negative electrode slurry prepared on one surface of the copper current collector (copper foil having a thickness of 8 μm) were applied to be formed at a thickness of 5:5 using a slot die by a multilayer simultaneous die coating method, dried, and rolled (rolling density: 1.68 g/cm$^3$) to manufacture a negative electrode in which the first negative electrode active material layer and the second negative electrode active material were formed on the current collector. A positive electrode and a secondary battery were manufactured in the same manner as in Example 1, except that the manufactured negative electrode was used.

Comparative Example 3

A negative electrode, a positive electrode, and a secondary battery were manufactured in the same manner as in Example 1, except that the binder suspension was prepared using CMC (D2200 available from Daicel) as a binder.

Comparative Example 4

A negative electrode, a positive electrode, and a secondary battery were manufactured in the same manner as in Example 1, except that the binder suspension was prepared using PAA (SW100 available from Sumitomo Seika Chemical Co., Ltd.) as a binder.

Comparative Example 5

A negative electrode, a positive electrode, and a secondary battery were manufactured in the same manner as in Example 1, except that CMC (D2200 available from Daicel) and PAA (SW100 available from Sumitomo Seika Chemical Co., Ltd.) as a binder were mixed at a solid content ratio of 1:3 and diluted to prepare a binder solution.

Comparative Example 6

The thus-prepared binder suspension was applied on one surface of the copper current collector by a slot die coating method and then dried to form a binder layer, and a negative electrode slurry was applied on the binder layer formed by a slot die coating method and then dried to form a negative electrode active material layer. Thereafter, a negative electrode, a positive electrode, and a secondary battery were manufactured in the same manner as in Example 1, except that rolling (rolling density: 1.68 g/cm$^3$) was performed to manufacture a negative electrode in which a binder layer and a negative electrode active material layer were formed on the current collector.

Figure 2:
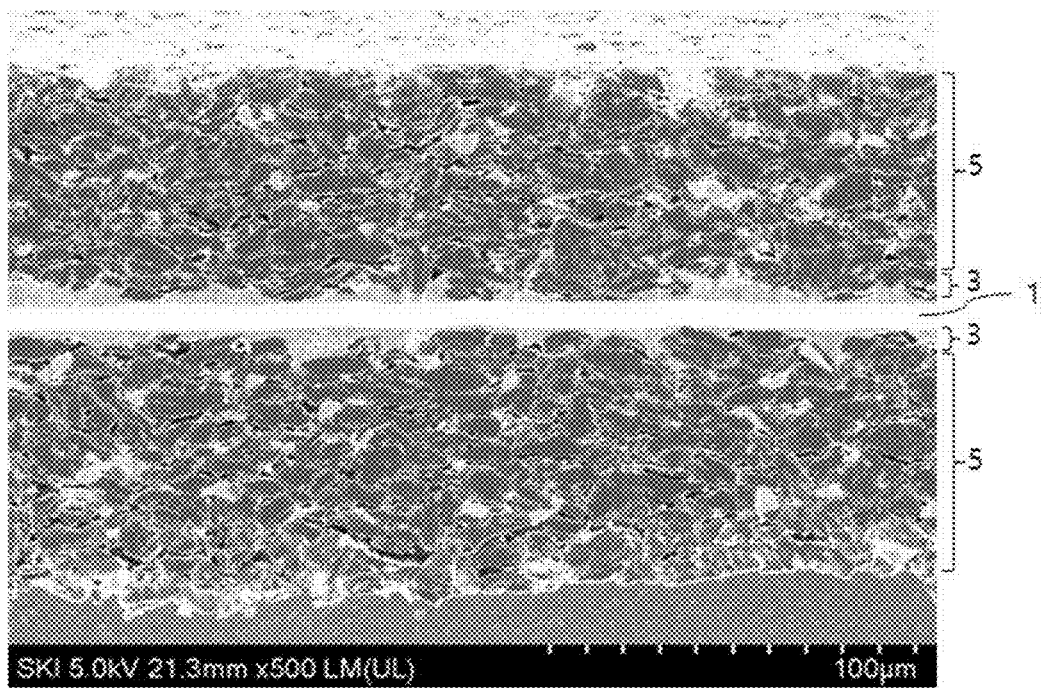
Figure 3:
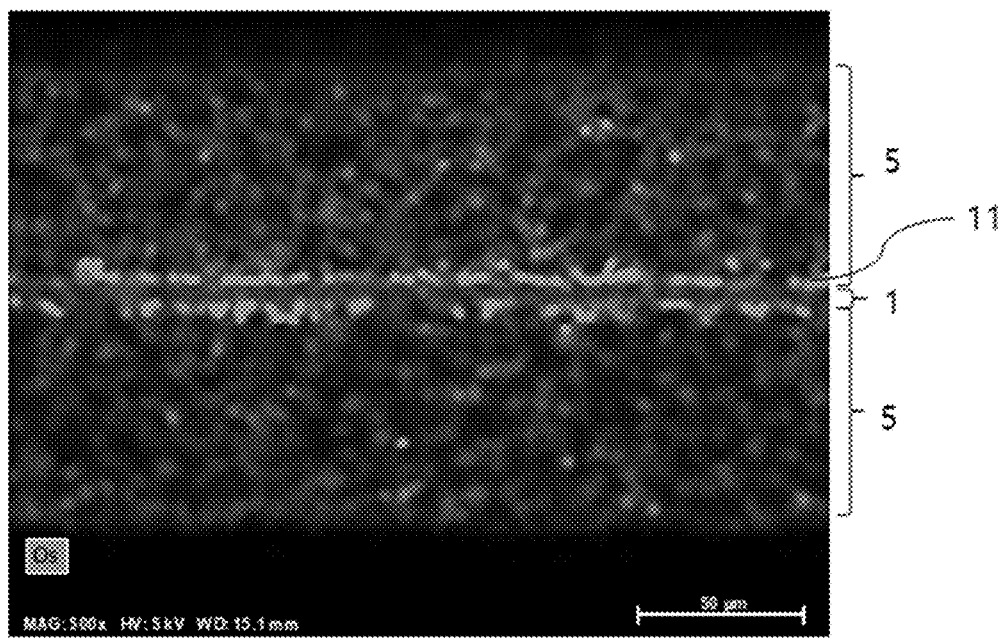
FIGS. 3 and 4 are results of EDS mapping in a thickness direction of the negative electrode manufactured in Example 1.
Figure 4:
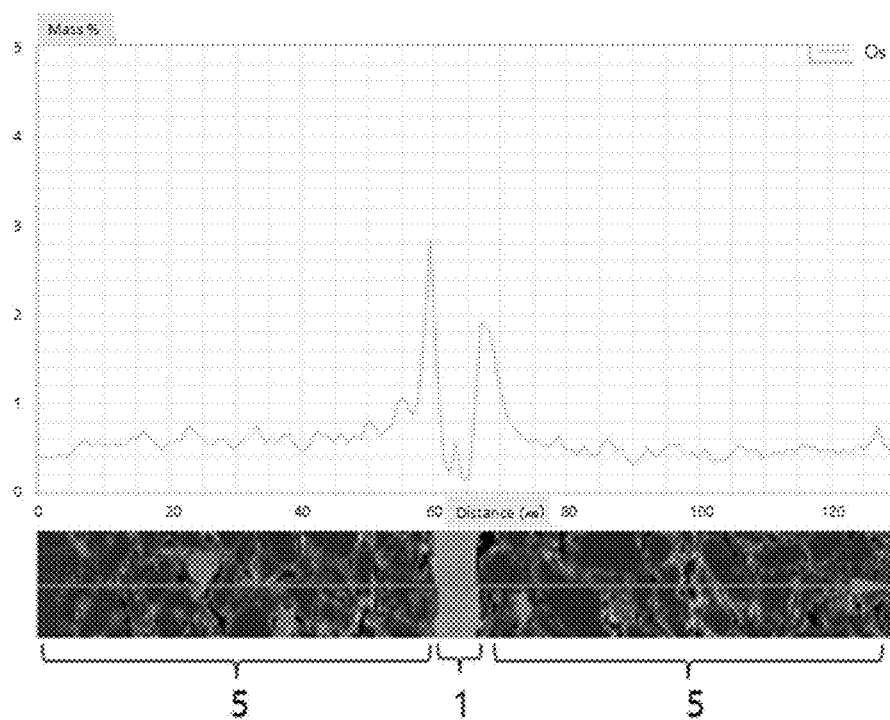

[Evaluation Example 1] Evaluation of Binder Distribution Characteristic in Thickness Direction of Negative Electrode and Binder Distribution Characteristic in Face Direction of Negative Electrode by Energy Dispersive X-Ray Spectroscopy (EDS) Mapping The results of cross-section SEM image in the thickness direction of the electrode manufactured in Example 1 and Comparative Example 6 are shown in FIGS. 1 and 2, and also, the results of EDS mapping in the thickness direction of the electrode manufactured in Example 1 are shown in FIGS. 3 and 4. Here, since it is difficult to distinguish the distribution of the SBR binder by general EDS mapping, Os gas was sufficiently exposed to the electrode, and then an image analyzing EDS mapping for an Os element was shown in FIG. 3, and an SBR (Os) content mass % profile graph in the thickness direction of the electrode was shown in FIG. 4.

Referring to FIG. 1, it was seen that the electrode manufactured in Example 1 had unclear division between the binder layer and the active material layer, and it is analyzed that this is due to migration of the SBR binder to the electrode active material layer. It may be confirmed from the SEM image that by using the SBR binder suspension, the binder suspension was able to be applied at a sufficiently small thickness, and since the SBR binder particles migrated to the electrode slurry layer in an electrode drying process, a contact between the current collector and the active material layer was very closely formed as if the binder layer was not further applied. However, in FIG. 2, the binder was applied and dried to form a separate binder layer which was distinguished from the electrode active material layer, and thus, it was confirmed in the SEM image also that the binder layer and the active material layer were formed on the current collector, respectively.

Therefore, it was confirmed that though the binder layer which is an insulator was evenly applied in the width direction without applying a conventional pattern coating, an electrode of which interfacial specific resistance value is not increased may be manufactured.

Referring FIGS. 3 and 4, it was confirmed that the binder was continuously distributed at a relatively high concentration in an areas of the active material layer from the boundary between the electrode current collector and the active material layer. From the results, it was seen that the adhesive strength (adhesion) in the boundary between the current collector and the electrode active material layer may be greatly improved, and also the binder particles migrate to the electrode active material layer during the drying process, and thus, adhesive strength (cohesion) of a certain area in the lower portion of the electrode active material layer may be improved.

In addition, the cross-sectional SEM image in the thickness direction of the electrode and the results of analyzing EDS mapping for Examples 1 to 4 and Comparative Examples 1 to 6 are shown in Table 1. Specifically, a content of an Os element $a_1$ (at %) per unit thickness for the entire area of the active material layer was measured, which was converted into a content of an entire area Os element content ($b_1$). A content of an Os element $a_2$ (at %) per unit thickness for an area corresponding to a 15% thickness from the current collector was measured, which was converted into a total Os content ($b_2$) at the 15% thickness. Then, $b_2/b_1$ was calculated and is shown in the following Table 1.

TABLE 1

| | Entire area of active material layer | | Thickness area from current collector | | |
|---|---|---|---|---|---|
| | $a_1$ (Os per unit thickness at %) | $b_1$ (=$a_1$ × 1.0) | $a_2$ (Os per unit thickness at %) | $b_2$ (=$a_2$ × 0.15) | $b_2/b_1$ (wt ratio) |
| Example 1 | 1.08 | 1.08 | 2.84 | 0.426 | 0.394 |
| Example 2 | 1.04 | 1.04 | 3.02 | 0.453 | 0.436 |
| Example 3 | 1.09 | 1.09 | 2.65 | 0.397 | 0.365 |
| Comparative Example 1 | 1.00 | 1.00 | 0.92 | 0.138 | 0.138 |
| Comparative Example 2 | 1.04 | 1.04 | 1.54 | 0.231 | 0.222 |
| Comparative Example 3 | | | Immeasurable | | |
| Comparative Example 4 | | | Immeasurable | | |
| Comparative Example 5 | | | Immeasurable | | |
| Comparative Example 6 | 1.03 | 1.03 | 3.77 | 0.565 | 0.549 |
| Example 4 | 2.86 | 2.86 | 12.38 | 1.857 | 0.649 |

It was confirmed in Examples 1 to 3 that a plurality of binders was distributed in the interface between the current collector and the active material layer, but it was seen that in Comparative Example 1, due to the migration phenomenon of the binder, the binder distributed in the interface between the current collector and the active material layer was insufficient relative to the average binder content of the entire active material layer. In Comparative Example 2, the content of the binder distributed in the interface was increased as compared with Comparative Example 1, but represented a low value as compared with the examples. This means that in Examples 1 to 3, the current collector and the active material layer were more strongly bound, and the content of the binder on the surface of the active material layer was low to be advantageous for fast charging performance.

[Evaluation Example 2] Evaluation of Interlayer Bonding Strength of Electrode and Interfacial Specific Resistance Value 1) 90° Bending Adhesive Strength of Electrode A 90° bending adhesive strength of the electrodes manufactured in Examples 1 to 4 and Comparative Examples 1 to 5 was measured, and the adhesive strength measured and the separated position in the electrode are shown in the following Table 2. In addition, the form in which the current collector and the electrode active material layer were separated was shown as schematic diagrams in (a) to (d) of FIG. 5, respectively.

Figure 6A:
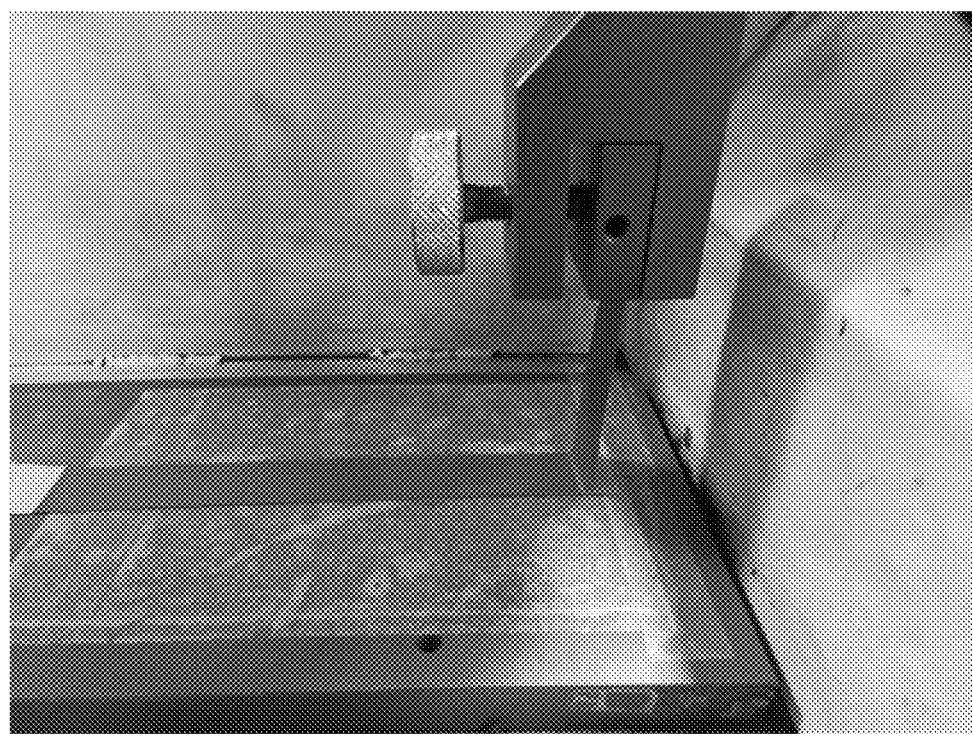
FIGS. 6A and 6B are photographs of a method of evaluating an interfacial adhesive strength (90° bending adhesive strength).
Figure 6B:
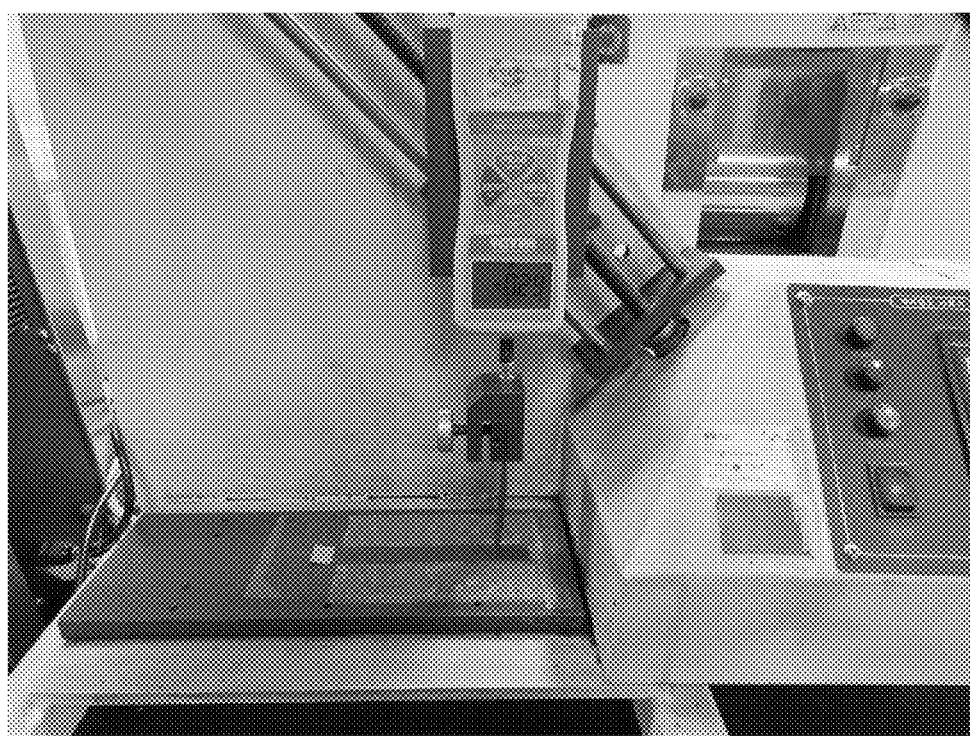
Figure 6C:
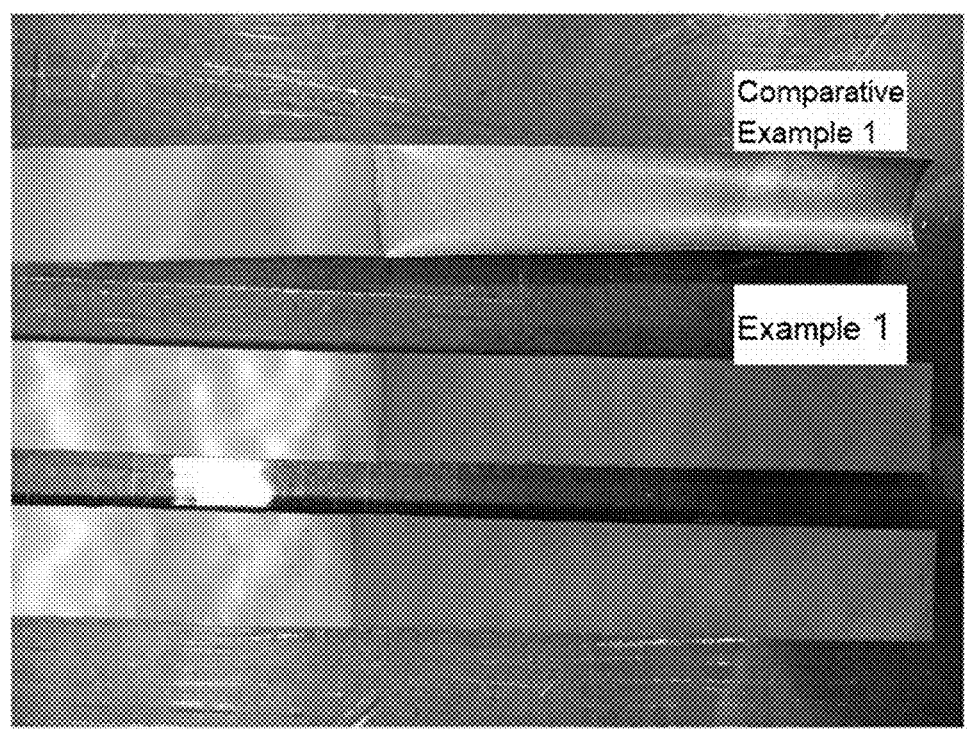
FIG. 6C is a photograph of a negative electrode separated after measuring a 90° bending adhesive strength for the negative electrodes according to Example 1 and Comparative Example 1.

*Evaluation of Interfacial Adhesive Strength Between Electrode Active Material Layer and Current Collector The negative electrodes manufactured in Examples 1 to 4 and Comparative Examples 1 to 6 were cut into 18 mm in width/150 mm in length, and a cross-sectional tape (3M) having a width of 18 mm was attached to a 100 mm position excluding about 50 mm in length on one surface of the electrode coated on both surfaces with a fastening portion of a tensile tester and then was sufficiently bonded with a roller having a loading of 2 kg. A double-sided tape was attached to the bottom surface of the tensile tester, and the double-sided tape surface and the single-sided tape of the manufactured electrode were attached face to face. A portion where the single-sided tape was not attached on the other side of the tensile tester was fastened, a 90° bending adhesive strength was measured (FIGS. 6A and 6B), and the results of dividing the strength measured by the width of the tape are summarized in the following Table 2. In addition, the adhesive strength for the negative electrodes according to Example 1 and Comparative Example 1 was measured, and then the photograph of the separated negative electrode is shown in FIG. 6C.

Meanwhile, i) an average separated position ($t_1$) was a value obtained by measuring a thickness of a portion including the current collector, of two portions separated by measuring the 90° bending adhesive strength using the electrode coated on both surfaces, and then subtracting the thickness of the current collector and the active material layer on the rear surface therefrom. The electrode thickness was measured 10 times using a 6.35 pi tip micrometer (293 series available from Mitutoyo) at a measurement voltage of 5 N, and an average value of 8 measurements excluding the upper and lower limits was calculated.

ii) the active material particle size ($t_2$) was a particle size (D50) of graphite active materials used in the examples and the comparative examples, of which a large particle diameter graphite active material particle size (D50) having a large diameter was determined as the particle size. Here, the large particle diameter graphite active material particle size was 13 μm.

TABLE 2

| | Adhesive strength (N/cm) | Average separated position ($t_1$) (μm) | Active material particle size ($t_2$) D50 | Whether Relation 1 is satisfied ($t_2 \leq t_1 \leq 8 \times t_2$) | Separated position division |
|---|---|---|---|---|---|
| Example 1 | 0.25 | 20.3 | 13 | ○ | Cohesion |
| Example 2 | 0.27 | 21.5 | 13 | ○ | Cohesion |
| Example 3 | 0.23 | 22.3 | 13 | ○ | Cohesion |
| Comparative Example 1 | 0.10 | 4.2 | 13 | X | Adhesion (current collector-active material layer) |

TABLE 2-continued

|  | Adhesive strength (N/cm) | Average separated position ($t_1$) (um) | Active material particle size ($t_2$) D50) | Whether Relation 1 is satisfied ($t_2 \leq t_1 \leq 8 \times t_2$) | Separated position division |
|---|---|---|---|---|---|
| Comparative Example 2 | 0.22 | 6.8 | 13 | X | Adhesion (current collector-active material layer) |
| Comparative Example 3 | 0.03 | 9.1 | 13 | X | Adhesion (binder layer-active material layer) |
| Comparative Example 4 | 0.02 | 9.2 | 13 | X | Adhesion (Binder layer-active material layer) |
| Comparative Example 5 | 0.03 | 9.6 | 13 | X | Adhesion (binder layer-active material layer) |
| Comparative Example 6 | 0.14 | 11.8 | 13 | X | Adhesion (binder layer-active material layer) |
| Example 4 | 0.29 | 33.7 | 13 | ○ | Cohesion |

Figure 5A:
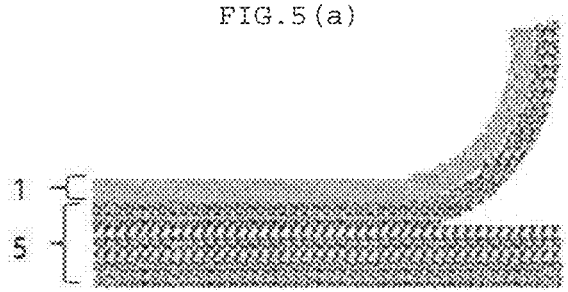
FIGS. 5(*a*)-5(*d*) are schematic diagrams showing forms in which the current collector and the negative electrode active material layer are separated by measuring a 90° bending adhesive strength for the negative electrodes manufactured in Examples 1 to 4 and Comparative Examples 1 to 6.

FIG. 5(a) is a schematic diagram showing the results of measuring the 90° bending adhesive strength of the electrodes manufactured in Examples 1 to 3. Referring to Table 2 and FIG. 5(a), it was seen that since cohesion within the electrode active material layer was weaker than adhesion of the interface between the current collector and the electrode active material layer, separation occurred within the negative electrode active material layer. That is, in order to be the form of FIG. 5(a), the binder content within the electrode active material layer should be low, and it was seen from the result that regarding the binder distribution, the binder content present in the electrode active material layer was low. After measuring the adhesive strength of Example 1, the photograph of the separated negative electrode may be confirmed in FIG. 6C.

Figure 5B:
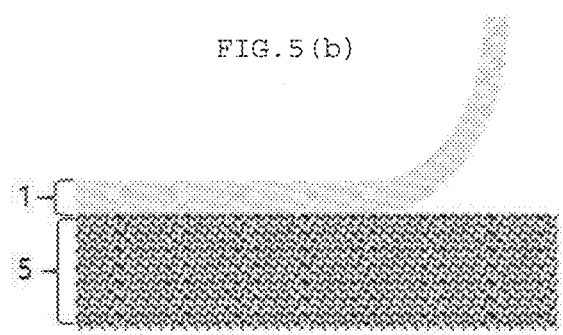

FIG. 5(b) shows the electrodes manufactured in Comparative Examples 1 and 2 as schematic diagrams, in which as the electrode slurry was applied directly on the current collector and dried, the current collector and the electrode active material layer were separated, when the 90° bending adhesive strength of a general electrode on which the electrode active material layer was formed was measured. Referring to Table 2 and FIG. 5(b), it was confirmed that in such case, since adhesion between the current collector and the electrode active material layer was weaker than cohesion within the electrode active material layer, separation occurred in the interface.

Figure 5C:
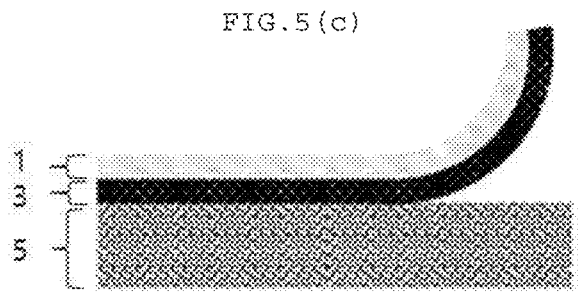

FIG. 5(c) shows electrodes manufactured in Comparative Examples 3 to 6 as schematic diagrams, in which the 90° bending adhesive strengths of the electrodes, when the current collector which was dried after coating the binder layer beforehand was coated with the electrode active material layer (Comparative Example 6) or the electrodes were manufactured using CMC and/or PAA (Comparative Examples 3 to 5), not the binder such as SBR which may implement the binder suspension when mixed with a solvent, were measured. In such case, separation in the interface between the binder layer and the electrode active material layer occurred, and referring to Table 2 and FIG. 5(c), it is suggested that when CMC and PAA binders were used instead of SBR, and when the SBR binder suspension was dried and then the negative electrode active material layer was applied, the binder does not migrate sufficiently to the electrode active material layer. Thus, it was confirmed that the binder layer and the electrode active material layer were clearly formed as each layer, and it was seen that since adhesion of the interface between the binder layer and the negative electrode active material formed was the weakest, the corresponding position was separated.

Figure 5D:
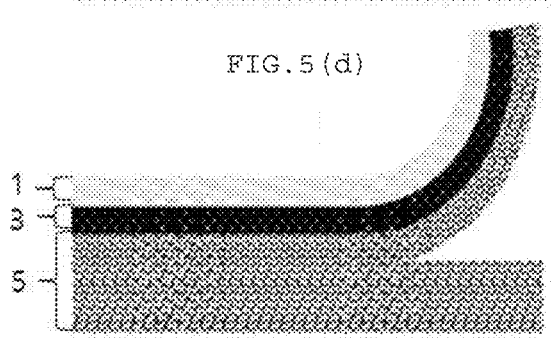

Meanwhile, FIG. 5(d) shows a negative electrode manufactured in Example 4, which was similar to FIG. 5(a), but in which the boundary between the binder layer and the active material layer was clearly divided. Referring to Table 2 and FIG. 5(d), when the SBR binder suspension was applied at a larger thickness than a standard value, the interfacial adhesive strength was improved due to migration of the SBR particles, but the binder layer was formed to be thick and may be serve as an insulation layer.

Meanwhile, referring to Table 2, it was confirmed that since in the electrode according to the present invention, the active material of the current collector was separated in a state of remaining in the form of a "layer" when the adhesive strength was measured, the electrode always had a thickness of $1.0 \times t_2$ or more. When the photograph of Example 1 of FIG. 6C was visually confirmed, it was seen that both the separated upper and lower layers were the active material layers. The average separated position satisfied Relation 1 of the present invention.

In contrast, it was confirmed that the conventional electrode to which the technology of the present invention was not applied was separated from the current collector in the interface, but was not clearly separated in the boundary, and the active material particles were uneven in the particle unit and separated. Specifically, when the photograph of Comparative Example 1 of FIG. 6C was visually confirmed, the Cu current collector occupied the most, and the active material particles remained in a small amount as scattered in some areas, which is different from Example 1 remaining in the form of the "active material layer". Here, the thickness of the average separated position was $0 \leq t_1 < 1.0 \times t_2$, and does not satisfy Relation 1 of the present invention. It is analyzed that such results are due to the fact that since the tip size of the thickness gauge was 6.35 pi which is large, a plurality of active material particles were included and measured as an average thickness.

2) Measurement of Interfacial Specific Resistance Value of Electrode

Interfacial resistance between the electrode and the current collector was measured for the electrodes manufactured in Examples 1 to 4 and Comparative Examples 1 to 6 using the interfacial specific resistance measuring instrument (XF057 available from Hioki), and the results are shown in the following Table 3.

TABLE 3

|  | Interfacial specific resistance value (ohm · cm$^2$) |
|---|---|
| Example 1 | 0.007 |
| Example 2 | 0.006 |
| Example 3 | 0.008 |
| Comparative Example 1 | 0.011 |
| Comparative Example 2 | 0.012 |
| Comparative Example 3 | Immeasurable |
| Comparative Example 4 | Immeasurable |
| Comparative Example 5 | Immeasurable |
| Comparative Example 6 | 0.083 |
| Example 4 | 0.257 |

Referring to Table 3, the electrode manufactured in Examples 1 to 3 of the present invention had the binder suspension applied thereon, but had the interfacial specific resistance values between electrode-current collector measured in the similar level to Comparative Examples 1 and 2. However, since Comparative Examples 3 to 5 did not secure sufficient adhesive strength, reliable interfacial specific resistance values were not able to be measured after rolling. Comparative Example 6 suggests that since the binder suspension was not mixed with the electrode active material, the binder insulator layer having a clear interlayer division was formed after drying. It is analyzed that in Example 4, since the insulator binder layer was formed thick, it was shown that the interfacial resistance was the highest.

[Evaluation Example 3] Evaluation of Fast Charging Performance

For the secondary batteries manufactured in Examples 1 to 4 and Comparative Examples 1 to 6, fast charge evaluation of charging at C-rate of 2.5 C at a temperature of 25° C., and discharging at ⅓ C C-rate was performed. After repeating 100 cycles and 200 cycles, a fast charging capacity retention rate was measured, and the results are shown in the following Table 4.

TABLE 4

|  | Evaluation of fast charging capacity retention rate (%) | |
|---|---|---|
|  | 100 cycles | 200 cycles |
| Example 1 | 96 | 83 |
| Example 2 | 97 | 84 |
| Example 3 | 96 | 83 |
| Comparative Example 1 | 79 | 58 |
| Comparative Example 2 | 90 | 69 |
| Comparative Example 3 | Cell manufacture failed | |
| Comparative Example 4 | Cell manufacture failed | |
| Comparative Example 5 | Cell manufacture failed | |
| Comparative Example 6 | 91 | 71 |
| Example 4 | 82 | 53 |

Referring to Table 4, it was confirmed that the lithium secondary batteries manufactured in Examples 1 to 3 had a less decrease in the cycle capacity retention rate (%) and secured excellent fast charging performance as compared with Comparative Examples 1 to 3. In Comparative Examples 1 and 2, it is analyzed that the binder was evenly distributed on the electrode surface, so that electrode resistance was increased and fast charging characteristic was deteriorated, and in Comparative Examples 3 to 5, a defect occurred in that the electrode active material layer was partially desorbed from the current collector during a press and notching process, and thus, cell manufacture was failed. In Comparative Example 6 and Example 4, it is analyzed that since the specific resistance value in the interface between the current collector and the active material layer was increased, the capacity characteristic was deteriorated as the charge and discharge cycle proceeded, as in Table 3.

[Evaluation Example 4] Evaluation of Adhesive Strength Between Active Material Layer and Current Collector Depending on Change in Electrode Drying Conditions Examples 5 to 9

Electrodes were manufactured in the same manner as in Example 1, except that in step 2 of Example 1, the drying process of the applied electrode slurry was as described in the following Table 5.

Comparative Example 7

An electrode was manufactured in the same manner as in Comparative Example 3, except that the drying process in Comparative Example 3 was as described in the following Table 5.

Evaluation Method

The interfacial adhesive strength between the active material layer and the current collector was evaluated in the same manner as in Evaluation Example 2, and the results are shown in the following Table 5.

TABLE 5

| Classification | Type of binder | Drying conditions | | Adhesive strength (N/cm) |
|---|---|---|---|---|
|  |  | Drying temperature (°) | Drying time (sec) |  |
| Example 1 | SBR | 120 | 60 | 0.25 |
| Example 5 |  | 110 | 80 | 0.27 |
| Example 6 |  | 100 | 100 | 0.28 |
| Example 7 |  | 135 | 45 | 0.21 |
| Example 8 |  | 150 | 30 | 0.17 |
| Example 9 |  | 80 | 300 | 0.25 |
| Comparative Example 7 | CMC | 100 | 100 | 0.05 |

Referring to Table 5, it was confirmed that when the drying temperature was 120° C. or lower which is low (Examples 1, 5, 6, and 9), the drying time was increased for evaporating all solvent, but the binder particles in the binder suspension migrated to the electrode active material layer to increase the adhesive strength between the current collector and the active material layer. When the drying temperature was excessively high (Examples 7 and 8), it is analyzed that the active material particles were easily exposed to the solvent surface during the drying process due to rapid drying, and thus, the binder particles excessively migrated due to a capillary phenomenon, the adhesive strength was somewhat decreased.

In Comparative Example 7, it was confirmed that though the same drying process as Example 6 which is the condition having the best adhesive strength was performed, the adhesive strength was the lowest.

[Evaluation Example 5] Binder Distribution Characteristic in Width Direction of Electrode Active Material Layer Interface

*Evaluation of Interfacial Adhesive Strength Between Electrode Active Material Layer and Current Collector The negative electrode manufactured in Example 1 was cut into 18 mm in width/350 mm in length with the width direction being the length direction, and a cross-sectional tape (3M) having a width of 18 mm was attached to a 300 mm position excluding about 50 mm in length on one surface of the electrode coated on both surfaces with a fastening portion of a tensile tester and then was sufficiently bonded with a roller having a loading of 2 kg. A double-sided tape was attached to the bottom surface of the tensile tester, and the double-sided tape surface and the single-sided tape of the manufactured electrode were attached face to face. A portion on which the single-sided tape was not attached was fastened to the other side of the tensile tester, the 90° bending adhesive strength was measured for a total of 1201 areas having intervals of 0.25 mm in the width direction of the negative electrode, and the results from dividing the measured strength by the width of the tape were shown in FIG. 7. Then, the scatter (%) characteristics of the adhesive strength measured in 1201 areas were shown in FIG. 8. Here, the scatter (%) was calculated by (individual value of adhesive strength in each area−average value of adhesive strength)/(average value of adhesive strength).

Figure 7:
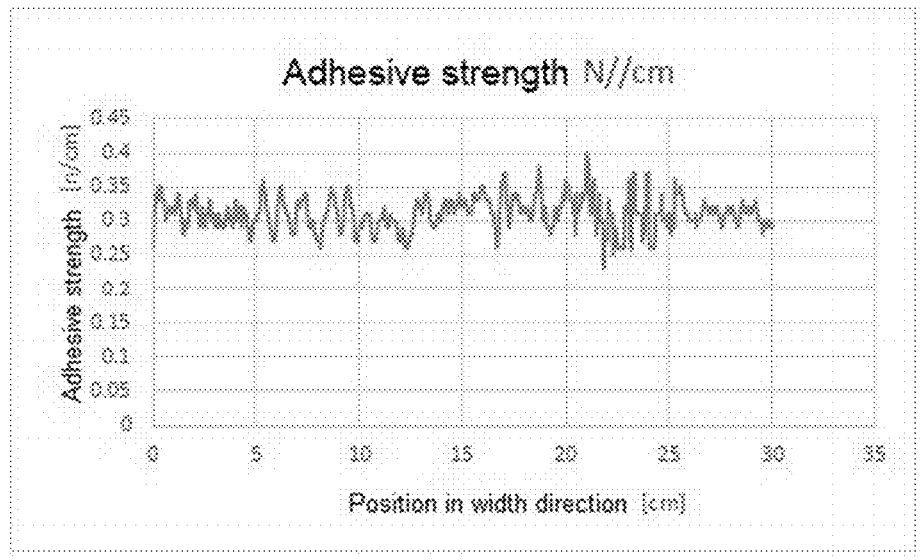
FIGS. 7 and 8 are an interfacial adhesive strength graph between the current collector and the negative electrode active material measured in a width direction position of the negative electrode active material layer and a scatter (%) chart of the adhesive strength.
Figure 8:
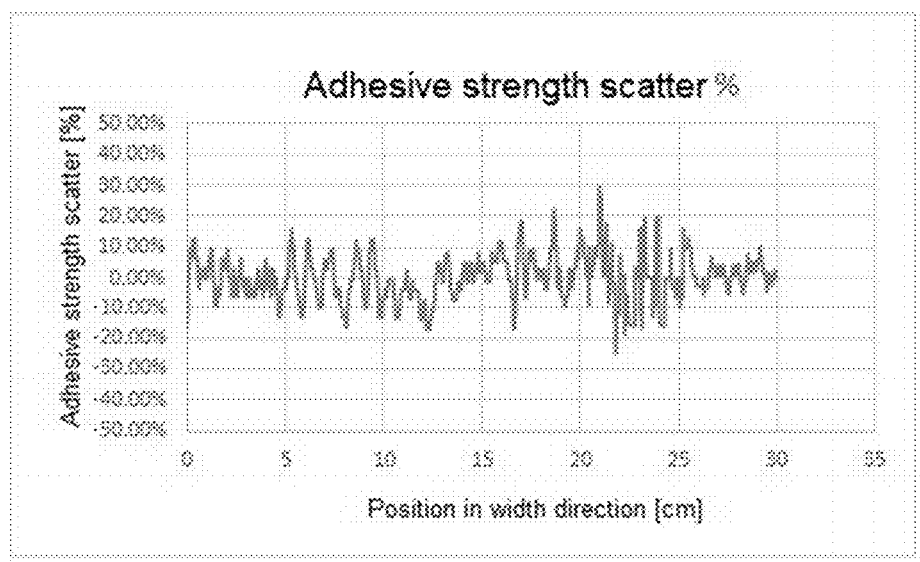

Referring to FIGS. 7 and 8, it was confirmed that the electrode manufactured in Example 1 was formed so that the SBR binder particles were evenly distributed in the width direction in the active material layer.

[Evaluation Example 6] Evaluation of Interlayer Adhesive Strength of Electrode for Each Size of Active Material Particles Example 10

An SBR (BM451B available from Zeon) suspension as a binder was diluted in pure water to prepare a binder suspension.

$SiO_x$-based negative electrode active material (D50: 6 um), a CMC thickener, an SBR binder were added to water at a weight ratio of 98:1:1.0 to prepare a negative electrode slurry having a viscosity of 5,000 cps.

A negative electrode, a positive electrode, and a secondary battery were manufactured in the same manner as in Example 1, except that the thus-prepared binder suspension was first applied on one surface of a copper current collector (copper foil having a thickness of 8 μm) by gravure coating and then the negative electrode slurry was applied using a slot die. Here, the thickness of the binder suspension applied by gravure coating was 2 um (based on the thickness after drying when the binder suspension was applied alone), and the thickness of the finally coated electrode was 204 um.

The negative electrode after drying was rolled (rolling density: 1.68 $g/cm^3$) to manufacture a negative electrode in which a negative electrode active material layer was formed on the current collector.

Example 11

An SBR (BM451B available from Zeon) suspension as a binder was diluted in pure water to prepare a binder suspension.

A Sic-based negative electrode active material (D50: 2 um), a CMC thickener, an SBR binder were added to water at a weight ratio of 98:1:1.0 to prepare a negative electrode slurry having a viscosity of 5,000 cps.

A negative electrode, a positive electrode, and a secondary battery were manufactured in the same manner as in Example 1, except that the thus-prepared binder suspension was first applied on one surface of a copper current collector (copper foil having a thickness of 8 μm) by gravure coating and then the negative electrode slurry was applied using a slot die. Here, the thickness of the binder suspension applied by gravure coating was 2 um (based on the thickness after drying when the binder suspension was applied alone), and the thickness of the finally coated electrode was 200 um.

The negative electrode after drying was rolled (rolling density: 1.68 $g/cm^3$) to manufacture a negative electrode in which a negative electrode active material layer was formed on the current collector.

*Evaluation of Interfacial Adhesive Strength Between Electrode Active Material Layer and Current Collector The interfacial adhesive strength between the electrode active material layer and the current collector was evaluated in the same manner as in Evaluation Example 2. The 90° bending adhesive strength measured and the separated position in the electrode are shown in the following Table 6.

TABLE 6

| | Adhesive strength (N/cm) | Average separated position (t1) (um) | Active material particle size (t2, D50) (um) | 5 × t2 (um) | 8 × $t_2$ (um) |
|---|---|---|---|---|---|
| Example 1 | 0.25 | 20.3 | 13 | 65 | 104 |
| Example 10 | 0.22 | 38.3 | 6 | 30 | 48 |
| Example 11 | 0.15 | 13.6 | 2 | 10 | 16 |

(In Table 6, $t_2$ is a particle size (D50) of a large particle diameter negative electrode active material of the mixed negative electrode active material.)

Referring to Table 6, it was confirmed that since in the electrode according to the present invention, the active material of the current collector was separated in a state of remaining in the form of a "layer", the electrode always had a thickness of 1.0×$t_2$ or more. In addition, it was confirmed that Example 1 corresponding to a preferred range of the average separated position showed better adhesive strength than Examples 10 and 11.

The present invention may have an improved interfacial adhesive strength between a current collector and an electrode active material layer, may improve process defects such as electrode desorption, and may improve fast charging performance.

Although the exemplary embodiments of the present invention have been described above, the present invention is not limited to the exemplary embodiments but may be made in various forms different from each other, and those skilled in the art will understand that the present invention may be implemented in other specific forms without departing from the spirit or essential feature of the present invention. Therefore, it should be understood that the exemplary embodiments described above are not restrictive, but illustrative in all aspects.

What is claimed is:

1. An electrode for a secondary battery comprising:
a current collector; and
an electrode active material layer disposed on at least one surface of the current collector,
wherein the electrode satisfies the following Relation 1:

$$t_2 \leq t_1 \leq 8 \times t_2 \quad \text{[Relation 1]}$$

wherein $t_1$ is a thickness of the electrode active material layer excluding the current collector on the side close to the current collector based on a separated position within the electrode active material layer when a 90° bending adhesive strength of the electrode is measured, and $t_2$ is a particle size (D50) of an electrode active material included in the electrode active material layer.

2. The electrode for a secondary battery of claim 1, wherein the electrode further satisfies the following Relation 2:

$$1.5 \times t_2 \leq t_1 \leq 5 \times t_2 \quad \text{[Relation 2]}$$

wherein $t_1$ is a thickness of the electrode active material layer excluding the current collector on the side close to the current collector based on a separated position within the electrode active material layer when the 90° bending adhesive strength of the electrode is measured, and $t_2$ is a particle size (D50) of an electrode active material included in the electrode active material layer.

3. The electrode for a secondary battery of claim 1, wherein the electrode active material layer further comprises a styrene butadiene rubber (SBR)-based binder.

4. The electrode for a secondary battery of claim 3, wherein the electrode active material layer comprises 0.1 to 2 wt % of the binder with respect to a total weight.

5. The electrode for a secondary battery of claim 1, wherein the electrode further satisfies the following Relation 3:

$$0.25 \leq b_2/b_1 < 0.7 \quad \text{[Relation 3]}$$

wherein $b_1$ is a weight of the binder in the entire electrode active material layer, and $b_2$ is a weight of the binder in a 15% area from the current collector based on the total thickness of the electrode active material layer, when a binder distribution is measured in the thickness direction of the electrode active material layer.

6. The electrode for a secondary battery of claim 5, wherein the electrode further satisfies the following Relation 4:

$$0.3 \leq b_2/b_1 < 0.5 \quad \text{[Relation 4]}$$

wherein $b_1$ is a weight of the binder in the entire electrode active material layer, and $b_2$ is a weight of the binder in a 15% area from the current collector based on the total thickness of the electrode active material layer, when the binder distribution is measured in the thickness direction of the electrode active material layer.

7. The electrode for a secondary battery of claim 1, wherein the electrode has a continuous binder concentration in the thickness direction of the electrode.

8. The electrode for a secondary battery of claim 1, wherein the electrode further satisfies the following Relation 5:

$$-30\% \leq (C-D)/D \leq +30\% \quad \text{[Relation 5]}$$

wherein C is an interfacial adhesive strength between the current collector and the electrode active material layer, measured at an arbitrary position selected in the width direction of the electrode active material layer, and D is an average value of the interfacial adhesive strength between the current collector and the electrode active material layer.

9. The electrode for a secondary battery of claim 1, wherein the electrode is a negative electrode.

10. A secondary battery comprising the electrode of claim 1; a separator; and an electrolyte solution.

* * * * *